May 3, 1932. J. H. BROWN 1,856,089

LIQUID FUEL INJECTION VALVE FOR DIESEL AND LIKE ENGINES

Filed March 4, 1931

Inventor,
James Henry Brown
M. H. Lockwood
Attorney.

Patented May 3, 1932

1,856,089

UNITED STATES PATENT OFFICE

JAMES HENRY BROWN, OF TEL-AVIV, JAFFA, PALESTINE

LIQUID FUEL INJECTION VALVE FOR DIESEL AND LIKE ENGINES

Application filed March 4, 1931, Serial No. 519,934, and in Great Britain April 11, 1930.

This invention relates to fuel valves of the air injection type for Diesel and like engines. Such valves are frequently provided with a flame plate, nozzle or distributing injector (hereinafter referred to as a nozzle), which controls the distribution and penetration of the fuel into the highly heated air in the cylinder at the end of the compression stroke. The nozzle is provided with one or more holes through which the fuel passes into the cylinder, and these holes require periodic cleaning, since they tend to become choked with carbon, which impedes the working of the engine. The object of the present invention is to inhibit the choking of these holes, thus reducing the maintenance required for the engine.

It has been ascertained that choking is due to burning on of oil during the compression and/or firing strokes, the presence of oil on the nozzle sometimes being due to dribbling from the fuel valve. According to the present invention, therefore, a fuel valve for a Diesel or like internal combustion engine having a nozzle of the kind specified is provided with means for shielding the hole or holes in the nozzle during the compression stroke.

For this purpose the nozzle may be arranged to be withdrawn into a shield during the compression stroke, in order to shield the holes; and with this arrangement the nozzle may be provided with a facing or the like, so that, when withdrawn, the said facing abuts against a co-operating facing to hinder the escape of any oil which may dribble from the fuel valve.

Figure 1:
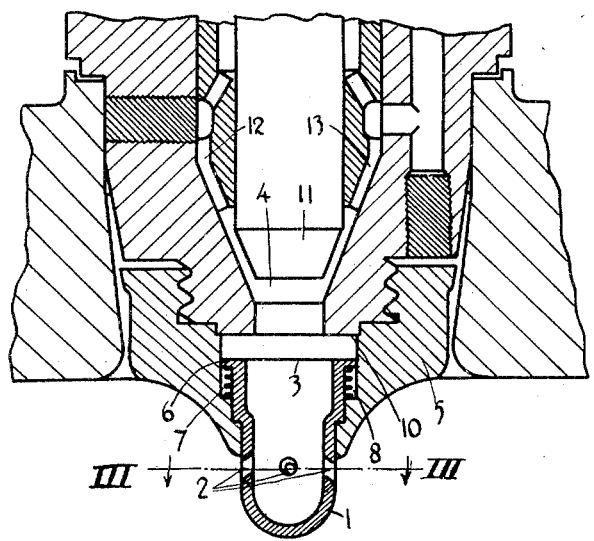
Figure 2:
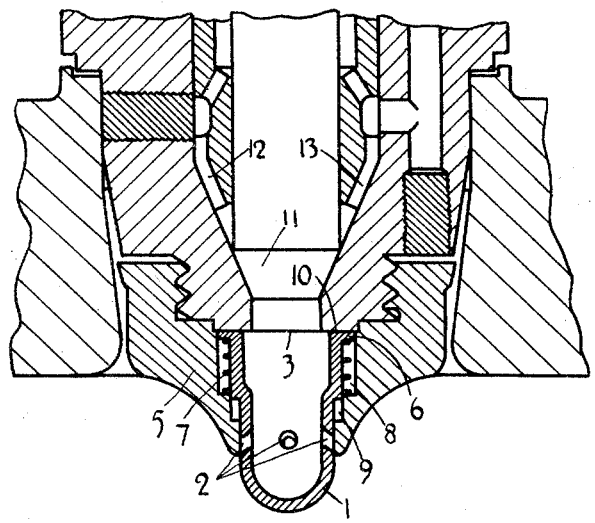
Figure 3:
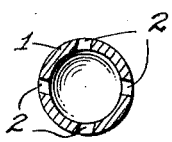

The invention will now be described, by way of example, with reference to the accompanying drawings of a fuel valve for a Diesel engine; Figure 1 showing the valve in the open position, Figure 2 in the closed position, and Figure 3 shows a section on the line III—III of Figure 1.

With reference to the drawings the fuel valve has a closed member 11, which is adapted to effect closure of a valve opening 4 and so to control the flow of air and oil to the engine along passageways 12 and 13. A fuel nozzle is given the form of a thimble 1 having a number of holes 2 in its side walls. The open end 3 of the thimble is presented to the fuel valve opening 4, and the thimble is arranged to slide longitudinally in a cylindrical shield 5. A flange 6 is formed on the open end 3 of the thimble 1, and between this flange 6 and the shield 5 is arranged a spring 7 which tends to retract the thimble 1 into the shield 5, into a position in which the holes 2 in the thimble 1 are masked by the shield 5.

When the fuel valve is opened, the fuel introduced under pressure into the thimble 1 forces it forwards and uncovers the holes 2, through which the fuel is accordingly sprayed. The gradual unmasking of the holes 2 in the nozzle, giving a preliminary vigorous emission of a small quantity of oil, assists in promoting a rapid and thorough combustion. During the forward movement of the thimble 1 air, entrapped in spaces 8 and 9, is expelled and this helps to retard the forward movement of the thimble 1 and to cushion it towards the end of its forward movement.

The holes 2 are drilled in the thimble 1 in an upward and sideward direction, so that the jets of fuel issuing from the holes have a tangential component, which causes the thimble 1 to rotate during spraying. This rotation prevents the flame from always striking the piston head at the same spot, and also tends to give a whirling motion to the gas in the cylinder, thereby further assisting combustion.

During the compression stroke, the increased air pressure in the cylinder, assisted by the action of the spring 7, causes the thimble 1 to be retracted into the shield 5. The holes 2 in the thimble are now covered by the shield 5, thus protecting them from the hot compressed gas in the cylinder, the oil on the outside of the thimble being wiped off the outside of the thimble during the movement of the thimble. The spring 7 may, if desired be dispensed with, the thimble being retracted during the compression stroke by the increased air pressure alone.

The flange 6 on the thimble 1 is faced and engages a facing 10 when the thimble is retracted. In this way, any tendency to leakage of oil which may dribble from the fuel valve, is inhibited.

I claim:—

1. A fuel valve of the air injection type for an internal combustion compression ignition engine comprising a part formed with a valve opening, a valve closing member for closing the opening, a nozzle formed with at least one hole through which the fuel after passing through the valve opening is forced under pressure direct into the cylinder, a shield and means for withdrawing the nozzle within the shield to cover the hole when fuel is not being forced into the cylinder.

2. A fuel valve of the air injection type for an internal combustion compression ignition engine comprising a part formed with a passageway for air and a passageway for fuel, a nozzle formed with at least one hole through which the fuel is forced under pressure direct into the cylinder and with which the passageways for air and fuel communicate, a member for opening and closing the communication between the passageways and the nozzle and means for shielding the hole when fuel is not being forced therethrough into the cylinder.

3. A fuel valve of the air injection type for an internal combustion compression ignition engine comprising a nozzle formed with at least one hole through which fuel is forced under pressure direct into the cylinder, a part formed with a valve opening through which air and fuel pass to the nozzle, a member for closing the opening, a shield within which the nozzle slides and a spring arranged to bias the nozzle to a position in which the hole is covered by the shield, the pressure of the spring being such that when the valve opening is open the pressure of the air and fuel overcomes the bias of the spring and thereby uncovers the hole.

4. A fuel of the air injection type for an internal combustion compression ignition engine comprising a nozzle formed with a facing and with at least one hole through which fuel is forced under pressure direct into the cylinder, a part formed with a valve opening communicating with the nozzle and formed with a complementary facing against which the other facing is arranged to abut, a member for controlling the flow of air and fuel through the opening to the nozzle, a shield and means for withdrawing the nozzle into the shield when air and fuel are not flowing to the nozzle so that the hole is covered by the shield, said means being arranged at the same time to press the two facings together to form a substantially fuel tight joint.

5. A fuel valve of the air injection type for an internal combustion compression ignition engine comprising a rotatable nozzle formed with at least one hole through which fuel is forced under pressure direct into the cylinder, a part formed with a valve opening, a member for controlling the flow of air and fuel through the opening to the nozzle, a shield and means for effecting withdrawal of the nozzle within the shield when air and fuel are not flowing through the opening so that the hole is covered by the shield, the hole in the nozzle being so formed that the oil issues therefrom in a direction having a tangential component and thereby effects rotation of the nozzle during spraying.

JAMES HENRY BROWN.